United States Patent
Ilinsky et al.

[15] 3,703,643
[45] Nov. 21, 1972

[54] SUPPLY SOURCE FOR ELECTRICAL PLANTS, FURNISHING A CURRENT THE MAGNITUDE OF WHICH IS INDEPENDENT OF LOAD IMPEDANCE

[72] Inventors: Nikolai Fedotovich Ilinsky; Kirill Davidovich Gutterman; Vadim Vladimirovich Mikhailov, all of Moscow, U.S.S.R.

[73] Assignee: Moskovsky Ordena Levina Energetichesky Institut, Moscow, U.S.S.R.

[22] Filed: Feb. 25, 1971

[21] Appl. No.: 118,644

[52] U.S. Cl..................................307/52, 307/84
[51] Int. Cl..............................................H01j 3/38
[58] Field of Search.......307/52, 43, 57, 84, 153, 154

[56] References Cited

UNITED STATES PATENTS 3,185,857   5/1965   Johnson..................307/84 X

*Primary Examiner*—Herman J. Hohauser
*Attorney*—Waters, Roditi, Schwartz and Nissen

[57] ABSTRACT

Supply source for electrical plants, providing a current the magnitude of which is independent of load impedance, wherein the supply source is characterized in that it includes two voltage sources which are arranged whereby each may be regulated relative to the other, and wherein each is connected between one of two reactances and star connected with the load. The supply source enables the load current to be varied in any pre-determined manner for zero to a definite maximum value.

2 Claims, 6 Drawing Figures

3,703,643

SUPPLY SOURCE FOR ELECTRICAL PLANTS, FURNISHING A CURRENT THE MAGNITUDE OF WHICH IS INDEPENDENT OF LOAD IMPEDANCE

The present invention relates to supply sources for electrical plants, furnishing a current the magnitude of which is independent of load impedance, and may be used to power, say, electrothermal, electro-processing or electric-drive plant requiring an operating current stabilized in the face of variations in the load impedance with provisions for continuous adjustment of the level at which the current is stabilized.

There exists a supply source for electrical plants, furnishing an alternating current the magnitude of which if independent of load impedance, for example, P.Boucherot's system containing for each phase of the load an inductive and a capacitive element of an equal reactance, making up with the load a star connection coupled to an unregulated voltage source in such a way that one of said reactances is taken directly to one of the terminals of the source.

The Boucherot System or circuit herein referred to is disclosed in Boucherot P., "Calcul des alternateurs, transformateurs et alternomoteurs," Paris, 1910; Steinmetz K., "Theory and Calculation of Electric Circuits.," McGraw Hill, N.Y., 1917, and in "Inductive-Capacitive Converters for Converting Voltage Sources into Current Sources" by A.N. Milakh, B. E. Kubyshkin and I.V. Volkov, Kiev, 1964.

The load current in such supply sources is decided by its reactances and the mains voltage and is independent of load impedance. If, in such a case, it is necessary to regulate the load current in some pre-determined manner one has either to make the reactances synchronously regulated or to switch in additional regulating elements, which fact impairs the efficiency and reliability of the supply source as a whole.

An object of the present invention is to eliminate the above-mentioned disadvantage.

Another and a more specific object of the invention is to provide a supply source for industrial plants, furnishing a current the magnitude of which is independent of load impedance, so that the stabilized load current can be adjusted continuously from a definite maximum value to zero in a pre-determined manner, without having to make the reactances of the source synchronously regulated.

With these and other objects in view, the invention resides in that in a supply source for electrical plants, containing for each phase of the load, as does the known source, a capacitive and an inductive element of an equal reactance that make up with the load a star connection one reactive element of which is connected to a voltage source, the circuit of the other reactive element of said star connection contains, according to the invention, a second voltage source so that it can be regulated relative to the first voltage source and the other way around.

The regulated voltage source should preferably be a phase shifter connected on the primary side to a second, unregulated voltage source.

The supply source disclosed herein enables the load current to be regulated in any pre-determined manner from a definite maximum value to zero, has a higher efficiency and a greater reliability, and can be built around not only three-phase voltage sources, but also single-phase voltage sources, using standard elements.

The invention will be more fully understood from the following detailed description of preferred embodiments when read in connection with the accompanying drawings wherein.

Figure 1:
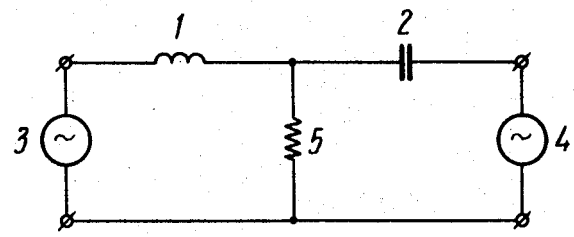
FIG. 1 is a circuit schematic diagram of a single-phase supply source for electrical plants.

Referring to FIG. 1, there is a single-phase supply source consisting of an inductive element 1, a capacitive element 2, and two single-phase voltage sources 3 and 4. A load 5 is connected between the common terminals of the elements 1 and 2 on one side and the voltage sources 3 and 4, on the other. The elements 1 and 2 have an equal reactance. Then the current flowing through the load (the load current is given by $$\overset{\circ}{I} = j(\overset{\circ}{V_4} - \overset{\circ}{V_3}/x),$$

where
$\overset{\circ}{V_3}$ = voltage vector of the voltage source 3;
$\overset{\circ}{V_4}$ = voltage vector of the voltage source 4;
$x$ = reactance of the elements 1 and 2;
$j$ = complex operator ($\sqrt{-1}$);

As follows from the above expression, in order to regulate the load current it will suffice to vary either the amplitude or the phase of the voltage furnished by one voltage source relative to the voltage furnished by the other voltage source, or both. From this expression it also follows that the load current is independent of the load parameters and can be regulated in any pre-determined manner from a definite maximum value to zero.

If the load is a three-phase one, any one of several arrangements are possible for its three-phase supply source (FIGS. 2 through 5). However, in all cases, the supply source comprises three inductive elements $1a$, $1b$, and $1c$, three capacitive elements $2a$, $2b$, and $2c$, and two three-phase voltage sources I and II, each of which is made up of star-connected single-phase voltage sources $3a$, $3b$, $3c$, and $4a$, $4b$, $4c$, respectively.

Figure 2:
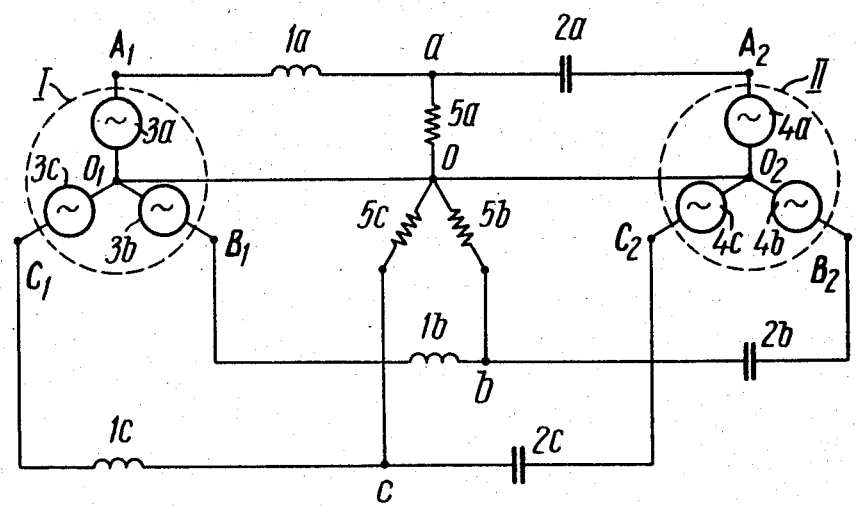
FIGS. 2 through 5 are circuit schematic diagrams of alternative arrangements of a three-phase supply source for electrical plants.

In the three-phase embodiment of the supply source shown in FIG. 2, the reactances $1a$, $1b$, $1c$, $2a$, $2c$ are placed between the terminals a and $A_1$, b and $B_1$, c and $C_1$, a and $A_2$, b and $B_2$, c and $C_2$, respectively. The three-phase load $5a$, $5b$, $5c$ is arranged into a star and connected to terminals a, b, c. Its common point is electrically connected to the neutral points $O_1$ and $O_2$ of the three-phase voltage sources I and II. As is seen, the arrangement of FIG. 2 is a triple combination of the arrangement shown in FIG. 1, and may be realized in cases where the neutral points of voltage sources are accessible for connection.

Figure 3:
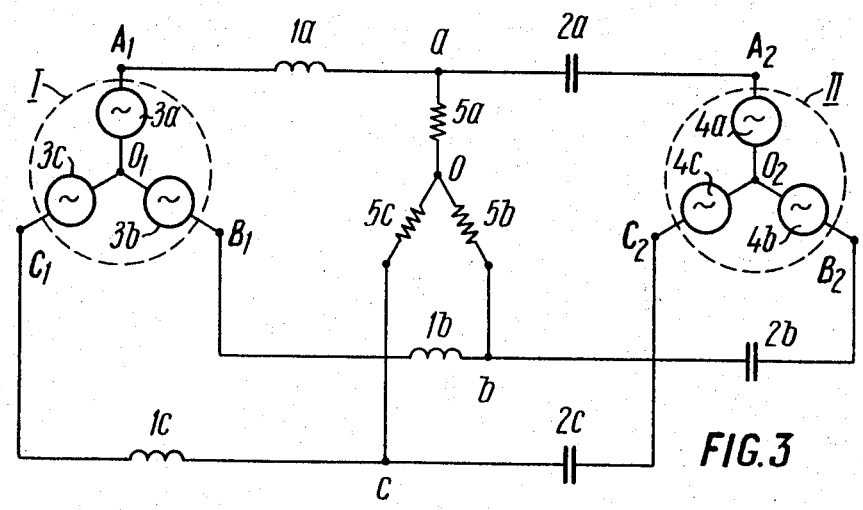

The arrangement of FIG. 3 differs from that of FIG. 2 in that there is no electrical connection from the neutral points $O_1$ and $O_2$ of the voltage sources to the common point O of a three-phase load.

Figure 4:
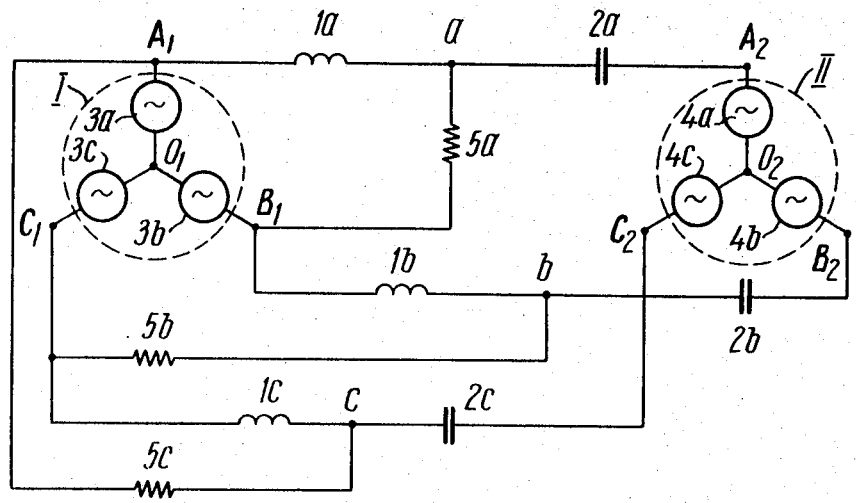

In the arrangement of FIG. 4, in contrast to that of FIG. 2, the load impedances $5a$, $5b$ and $5c$ are placed between points a and $B_1$, b and $C_1$, c and $A_1$, respectively, In addition to the arrangement shown in FIG. 4, it is possible to place the load impedance $5a$ between points a and $C_1$ (or $B_2$, or $C_2$), the load impedance $5b$ between points $b$ and $A_1$ (or $C_2$, or $A_2$), and the load impedance $5c$ between points $c$ and $B_1$ (or $A_2$, or $B_2$).

Figure 5:
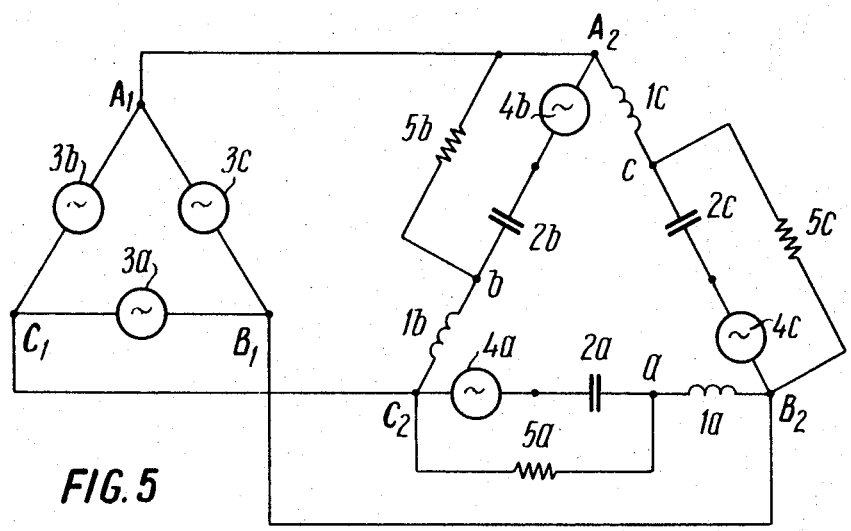

If one of three-phase voltage sources is a combination of three potentially decoupled single-phase sources, it is possible to realize the arrangement of FIG. 5 where the elements $1a$, $1b$ and $1c$ are placed between the points $a$ and B, $b$ and C, $c$ and A, respectively. In this case, the series circuits formed by the element $2a$ and the voltage source $4a$, the element $2b$ and the voltage source $4b$, and the element $2c$ and the voltage source $4c$ are connected in parallel with the load impedances $5a$, $5b$, $5c$ between the points $a$ and C, $b$ and A, $c$ and B, respectively.

Similarly, it is possible to obtain many more three-phase arrangements of a supply source. However, what is common to all of the configurations, both examined and possible, is that each of the load impedances makes up a star connection with an inductive and a capacitive element of an equal reactance and that each of the two a.c. voltage sources (for each load impedance) is connected between the free terminals of the reactances and the load impedances.

In order to regulate the load current, it is sufficient to vary either the magnitude or the phase of the three-phase system of voltages furnished by one of the voltage sources relative to that furnished by the other voltage source, or both.

Where only one three-phase voltage source is available, the other voltage source may be, for example, a three-phase rotary transformer (a phase shifter) the primary windings of which are connected to the mains, and the secondary windings to the terminals used for the connection of a second voltage source in the arrangements shown in FIGS. 2 through 5. In order to regulate the load current, it will suffice to vary the angle of rotation of the transformer.

Figure 6:
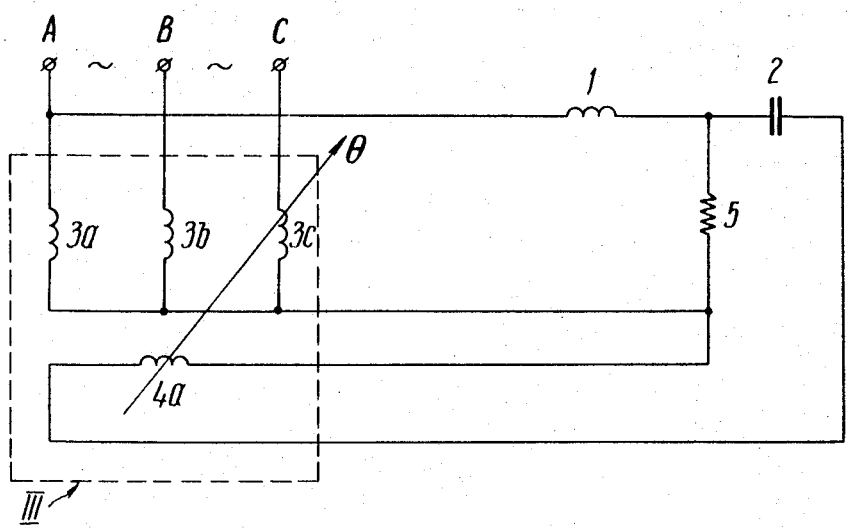
FIG. 6 is a circuit diagram of a single-phase supply source using a phase-shifter as a regulated voltage source.

FIG. 6 is a circuit schematic diagram of a single-phase supply source using a phase shifter III as a regulated voltage source. The inductive element 1 and the capacitive element 2 make up with the load 5 a star connection, as they do in other configurations. The circuit formed by the element 1 and the load impedance 5 is connected in parallel with the winding $3a$ of the phase shifter III, the primary windings of which $3a$, $3b$, $3c$ are arranged into a star and are energized from the a.c. mains A.B.C. The circuit formed by the element 2 and the load 5 is connected to the secondary winding $4a$ of the phase shifter III. In order to regulate the load current, it will suffice to vary the angle through which the phase shifter III is turned.

What is claimed is:

1. A supply source for electrical plants, furnishing a current the magnitude of which is independent of load impedance, comprising for each phase of the load: a capacitive and an inductive element of an equal reactance, star connected with the load; a voltage source placed between one of said reactances and the load; a second voltage source placed between the other said reactance and said load, so that one of said voltage sources can be regulated relative to the other said voltage source.

2. A supply source, as claimed in claim 1, in which one of said voltage sources is a phase shifter connected on the primary side to a second, unregulated voltage source.

* * * * *